(12) United States Patent
Kielwein et al.

(10) Patent No.: US 6,206,316 B1
(45) Date of Patent: Mar. 27, 2001

(54) BELT RETRACTOR WITH FORCE LIMITATION

(75) Inventors: Thomas Kielwein, Eschach; Jürgen Rink, Waldstetten; Johannes Schmid, Schwäbisch Gmünd, all of (DE)

(73) Assignee: TRW Occupant Restraint Systems GmbH & Co. KG, Alfdorf (DE)

( * ) Notice: Subject to any disclaimer, the term of this patent is extended or adjusted under 35 U.S.C. 154(b) by 0 days.

(21) Appl. No.: 09/339,741

(22) Filed: Jun. 24, 1999

(30) Foreign Application Priority Data

Jun. 30, 1998 (DE) ............................................ 298 11 662

(51) Int. Cl.⁷ .................................................... B65H 75/48
(52) U.S. Cl. ......................... 242/379.1; 280/805; 297/470
(58) Field of Search ......................... 242/379.1; 280/805; 397/470, 471, 472

(56) References Cited

U.S. PATENT DOCUMENTS

| | | | | |
|---|---|---|---|---|
| 3,666,198 | * | 5/1972 | Neumann | 242/379.1 |
| 4,323,205 | * | 4/1982 | Tsuge et al. | 280/805 |
| 5,526,996 | * | 6/1996 | Ebner et al. | 242/379.1 |
| 5,772,144 | * | 6/1998 | Tanabe et al. | 242/379.1 |
| 5,913,538 | * | 6/1999 | Herpich | 242/379.1 |
| 5,967,442 | * | 10/1999 | Wier | 242/379.1 |
| 5,975,451 | * | 11/1999 | Kawamoto | 242/379.1 |
| 6,029,924 | * | 2/2000 | Ono et al. | 242/379.1 |
| 6,047,914 | * | 4/2000 | Sasaki | 280/805 |

FOREIGN PATENT DOCUMENTS 29714583     1/1998   (DE) .

* cited by examiner

Primary Examiner—Emmanuel M. Marcelo
(74) Attorney, Agent, or Firm—Tarolli, Sundheim, Covell, Tummino & Szabo L.L.P.

(57) ABSTRACT

A belt retractor for a vehicle safety belt comprises a frame, a belt spool rotatably mounted in the frame, a locking catch arranged on the belt spool, a locking mechanism adapted to pivot the locking catch between an initial position and a locking position, a locking disc and a locking toothing. The locking toothing is arranged on the locking disc. The locking catch when in the locking position engages into the locking toothing of the locking disc so that the belt spool is locked with respect to the locking disc. The locking disc is connected to the frame by means of a holding device which allows a rotation of the locking disc relative to the frame only after a predetermined torque has been exceeded.

4 Claims, 3 Drawing Sheets

BELT RETRACTOR WITH FORCE LIMITATION

BACKGROUND OF THE INVENTION

Conventional belt retractors comprise a frame, in which a belt spool is rotatably mounted, locking teeth and a locking catch which can be brought from an initial position into a locking position by a locking mechanism, whereby the belt spool is locked relative to the locking teeth.

In addition to the usual function of a belt retractor, namely making available a safety belt and blocking the unwinding of the belt webbing from the belt spool if required, many belt retractors nowadays also make available a so-called force-limiting function. The force-limiting function consists in making possible an unwinding of the belt webbing, despite the belt spool actually being locked, when the force acting in the belt webbing exceeds a predetermined value. The unwinding of the belt webbing which is then possible leads to an additional way being made available for decelerating the vehicle occupant, whereby the forces occurring due to the acting deceleration are reduced. In this way, the forces due to deceleration can be limited to a value where usually no injuries of any kind occur to the occupant of the vehicle.

The force-limiting function can be achieved for example by means of a torsion rod which acts between the belt spool and the locking teeth, which are arranged on the belt spool.

The object of the invention consists in providing a belt retractor in which the force-limiting function can be realized with a low expenditure in terms of construction. Additionally, the limit of the torque acting on the belt spool, from which up the force-limiting function starts becoming effective, can be adapted easily to the respective requirements.

SUMMARY OF THE INVENTION

For this purpose, a belt retractor for a vehicle safety belt is provided, which comprises a frame, a belt spool rotatably mounted in the frame, a locking catch arranged on the belt spool, a locking mechanism adapted to pivot the locking catch between an initial position and a locking position, a locking disc and a locking toothing. The locking toothing is arranged on the locking disc. The locking catch when in the locking position engages into the locking toothing of the locking disc so that the belt spool is locked with respect to the locking disc. The locking disc is connected to the frame by means of a holding device which allows a rotation of the locking disc relative to the frame only after a predetermined torque has been exceeded. So under normal conditions the holding device causes the locking disc and hence the locking teeth to be held non-rotatably. Only if the torque is exceeding a predetermined value, the locking disc can be rotated relative to the frame, owing to the torque transferred to it from the belt spool via the locking catch and the locking teeth, whereby an unwinding of the belt webbing from the belt spool is possible.

Preferably the holding device contains a traction cable which loops around the circumference of the locking disc. Owing to the looping friction such a traction cable provides a comparatively high holding torque with already comparatively small traction forces acting in the traction cable. In contrast to known belt retractors, in which a torsion rod is used to provide the force-limiting function, the use of a traction cable makes it possible for the belt spool to carry out an unlimited number of turns relative to the frame of the belt retractor, when the force-limiting function is effective. In belt retractors with a torsion rod, the number of relative turns is usually limited to one or to a maximum of two turns of the belt spool relative to the frame.

Advantageous developments of the invention will be apparent from the subclaims.

BRIEF DESCRIPTION OF THE DRAWINGS

The invention is described below with reference to a preferred embodiment, which is shown in the enclosed drawings, in which.

DETAILED DESCRIPTION OF THE INVENTION

Figure 1:
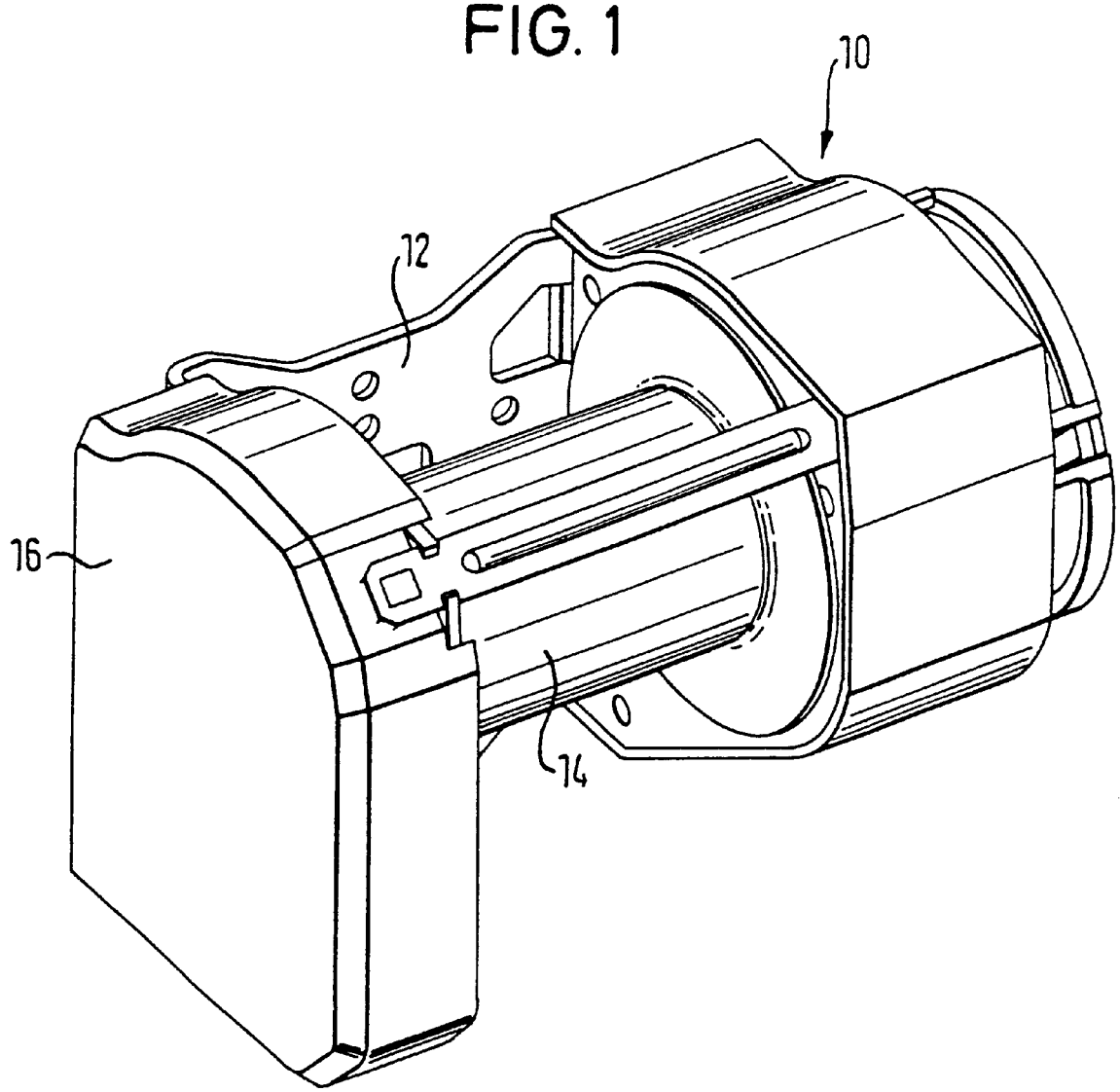
FIG. 1 shows a perspective view of a belt retractor according to the invention.

The belt retractor 10 shown in FIG. 1 contains a frame 12, in which a belt spool 14 is rotatably mounted, and also shows on an axial end of the belt spool a locking mechanism which is generally designated by 16. The belt spool 14 is provided to receive a belt webbing, not shown in the figures, and to make it available to a vehicle occupant. The locking mechanism 16 serves to lock the belt spool either in a vehicle-sensitive manner or a belt-webbing-sensitive manner so that no unwinding of the belt webbing is possible and the vehicle occupant, who is wearing the belt webbing, participates in the deceleration of the vehicle.

Figure 2:
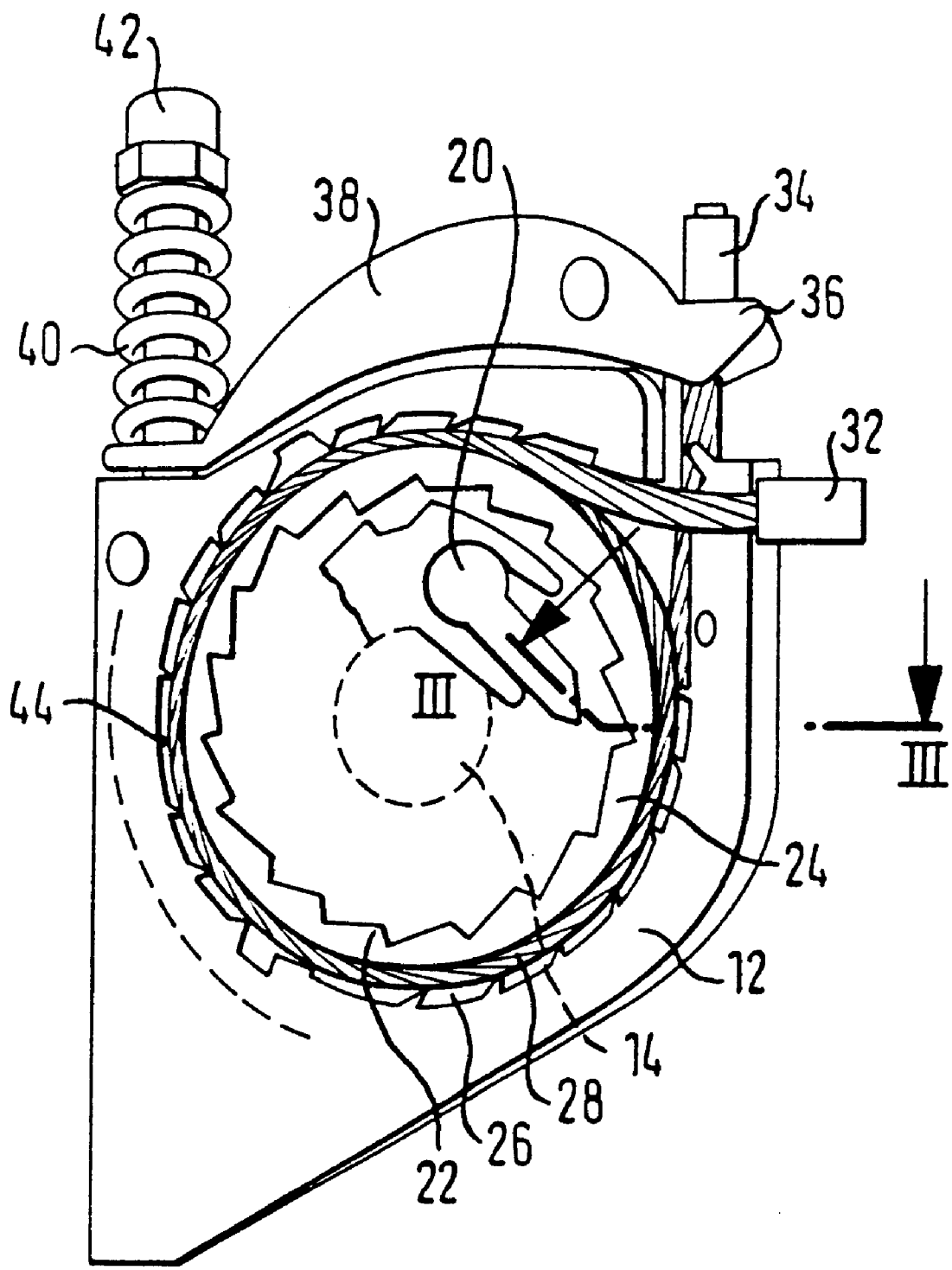
FIG. 2 shows a diagrammatic side view of the belt retractor of FIG. 1, covering parts having been removed.
Figure 3:
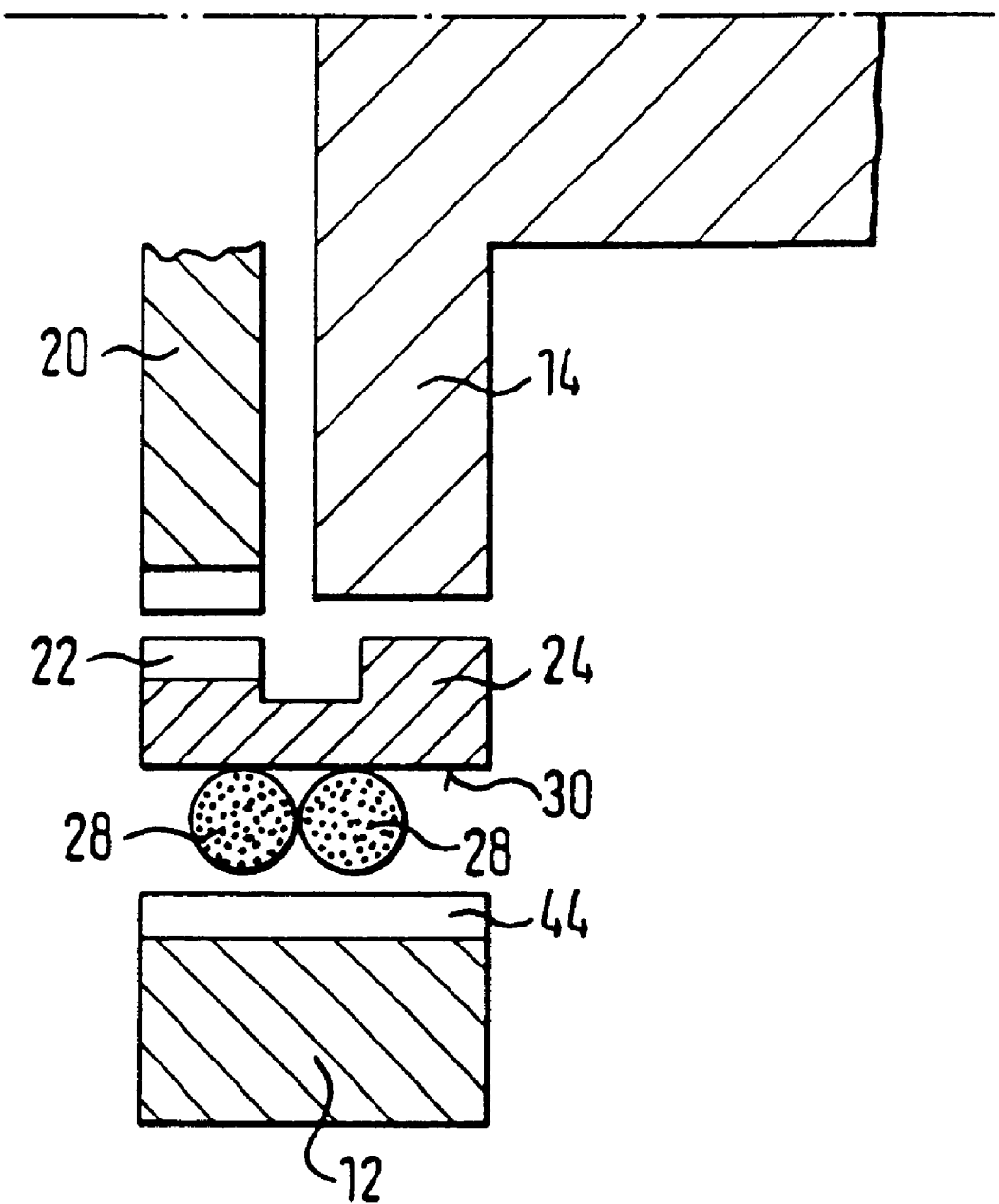
FIG. 3 shows diagrammatically a section along the line 111—111 of FIG. 2.

The mode of operation of the locking mechanism is of no importance for an understanding of the invention, so it is not illustrated in detail here. The only relevant factor is that a locking catch 20 (see FIG. 2) is mounted on the belt spool 14 and rotates with the latter. The locking catch 20 can be brought from the initial position shown in FIG. 2 into a locking position by the locking mechanism in a belt-webbing sensitive or vehicle-sensitive manner. In this locking position the locking catch has been rotated in an anti-clockwise direction with respect to the position shown, and engages into locking teeth 22 which are formed on a locking disc 24 (see also FIG. 3). The locking disc 24 is arranged rotatably in an opening 26 in the frame 12.

In the opening 26 in the frame 12 of the belt retractor, a traction cable 28 is additionally arranged, which loops around the locking disc 24 and lies on its exterior 30. The traction cable 28 is suspended by one end 32 on the frame 12, then loops around the locking disc 24 over 1 ¾ turns and is suspended on the other end 34 on a first arm 36 of a two-armed lever. The second end 38 of the two-armed lever is acted upon by a compression spring so that the traction cable 28 is exposed to a traction. In order to enable the level of the traction being adjusted, the pre-load of the spring 40 can be altered by means of a screw 42. The locking disc 24 is therefore held closely embraced by the traction cable 28, the traction cable 28 being able to rest against teeth 44 which are constructed along the periphery of the opening 26 in the frame 12.

The described belt retractor operates in the following manner: When the locking mechanism swings the locking catch 20 from the initial position shown in FIG. 2 until it is in engagement with the locking teeth 22, then the belt spool is locked relative to the locking disc. Owing to the looping friction provided by the traction cable 28, which is under traction and is anchored to the frame 12, the locking disc 24 is held non-rotatably relative to the frame 12 up to a torque dependent on the acting tractive force and the coefficient of friction between the traction cable and the locking disc. Only when the torque which is introduced from the belt spool via the locking catch into the locking disc exceeds a threshold value, the locking disc is able to slip with respect to the traction cable so that a rotation of the belt spool 14 is possible relative to the frame 12 of the belt retractor. Now, the belt webbing can be unwound with a predetermined force from the belt retractor, whereby the force-limiting function is realized.

By influencing the pre-load of the compression spring 40, the traction acting in the traction cable 28 and hence the torque necessary owing to the looping friction can be adjusted, which is necessary in order to rotate the locking disc 24 relative to the frame 12 of the belt retractor. The holding device formed by the traction cable, the two-armed lever and the compression spring 40 enables an unlimited number of turns of the locking disc 24 relative to the frame 12, when the belt webbing is to be unwound with a belt spool which itself is locked.

What is claimed is:

1. A belt retractor for a vehicle safety belt, comprising a frame, a belt spool rotatably mounted in said frame, a locking catch arranged on said belt spool, a locking mechanism adapted to pivot said locking catch between an initial position and a locking position, a locking disc and a locking toothing, said locking toothing being arranged on said locking disc, said locking catch when in said locking position engaging into said locking toothing of said locking disc so that said belt spool is locked with respect to said locking disc, said locking disc being connected to said frame by means of a holding device which allows a rotation of said locking disc relative to said frame only after a predetermined torque has been exceeded, said holding device containing a traction cable which loops around the circumference of said locking disc.

2. The belt retractor of claim 1, wherein said traction cable is tensioned with a predetermined force and loops around said locking disc over an angle between 360° and 720°.

3. The belt retractor of claim 2, wherein said holding device comprises a two-armed lever, one arm of said lever holding one end of said traction cable and the other arm of said lever being biased by a compression spring the pre-load of which is adjustable.

4. The belt retractor of claim 3, wherein said lever is arranged on said frame and the end of said traction cable not connected to said lever is suspended on said frame.

* * * * *